United States Patent [19]

Jameson

[11] 4,071,125
[45] Jan. 31, 1978

[54] POWER TRANSMISSION WITH TORQUE CONVERTER LOCKUP CLUTCH

[75] Inventor: James J. Jameson, Coffeyville, Kans.

[73] Assignee: Gardner-Denver Company, Dallas, Tex.

[21] Appl. No.: 707,475

[22] Filed: July 21, 1976

[51] Int. Cl.² .................. F16D 33/00; F16D 35/00; F16D 37/00

[52] U.S. Cl. ........................... 192/3.3; 74/732; 192/3.31

[58] Field of Search ............ 74/732, 733, 645; 192/3.29, 3.3, 3.31

[56] References Cited

U.S. PATENT DOCUMENTS

| | | | |
|---|---|---|---|
| 2,965,202 | 12/1960 | Christenson | 74/732 |
| 3,185,273 | 5/1965 | Smirl | 192/3.3 |
| 3,213,983 | 10/1965 | Smirl et al. | 192/3.3 |
| 3,239,037 | 3/1966 | Croswhite et al. | 192/3.3 |
| 3,516,524 | 6/1970 | Kelty et al. | 192/3.3 |
| 3,977,502 | 8/1976 | Chana | 192/3.3 |

FOREIGN PATENT DOCUMENTS 668,839 11/1929 France .................. 192/3.29

Primary Examiner—Samuel Scott
Assistant Examiner—Carl F. Pietruszka
Attorney, Agent, or Firm—Michael E. Martin

[57] ABSTRACT

A power transmission mechanism includes a hydrokinetic torque converter and a friction clutch disposed to form a positive mechanical drive from the input shaft to the output shaft of the torque converter. The friction clutch includes a piston disposed in the housing and forming opposed fluid chambers one of which includes the converter impeller and turbine disposed therein. An orifice in the piston conducts fluid from one chamber to the other and clutch engagement is controlled by regulating the fluid outflow from the other chamber. Clutch lockup or engagement may be controlled to be responsive to the pressure of fluid flowing into the converter or the difference in the pressure of the fluid flowing in and out of the converter.

2 Claims, 5 Drawing Figures

POWER TRANSMISSION WITH TORQUE CONVERTER LOCKUP CLUTCH

BACKGROUND OF THE INVENTION

This invention pertains to power transmission mechanisms of the type which include hydrokinetic couplings or torque converters and which further include so called lockup clutches which provide for a positive mechanical drive from the torque converter input shaft to the torque converter output shaft. Power transmissions which include torque converter lockup clutches are well known. Such clutch arrangements are usually employed to improve the efficiency of transmissions which include fluid couplings and particularly torque converter couplings which have the characteristic that as the ratio of the speed of the driven member (turbine) with respect to the driving member (impeller) approaches unity the efficiency of the fluid coupling decreases rapidly. The numerous arrangements of torque converter lockup clutches known in the art are generally characterized by a clutch actuating piston which is responsive to pressure fluid provided by a separate control circuit which further complicates the control circuitry of the transmission mechanism. Moreover, the structural arrangement of known lockup clutches for torque converters is generally somewhat complicated and tends to increase the overall size and weight of the transmission mechanism as well as the manufacturing cost.

SUMMARY OF THE INVENTION

The present invention provides a power transmission mechanism which includes a torque converter fluid coupling and a positive lockup clutch for bridging the torque converter to directly connect the converter input and output shafts, and improved and simplified means for controlling the engagement of the lockup clutch.

In the transmission mechanism of the present invention a torque converter lockup clutch is provided with a clutch actuating piston which is responsive to the pressure of the working fluid in the torque converter housing for engaging the clutch to form a direct mechanical drive between the torque converter input and output shafts.

The present invention also provides a transmission mechanism having a torque converter and associated lockup clutch wherein the clutch may be engaged and disengaged by controlling the outflow of torque converter working fluid from a chamber formed by the torque converter rotating housing and a piston disposed in and sealingly engaged with the housing. Clutch engagement may be further advantageously controlled in accordance with the pressure of the working fluid flowing into the torque converter or in accordance with the pressure difference between the fluid flowing into and out of the torque converter.

The present invention further provides a power transmission mechanism having a torque converter and an associated lockup clutch which is of simplified and economical construction.

DESCRIPTION OF THE PREFERRED EMBODIMENTS

Figure 1:
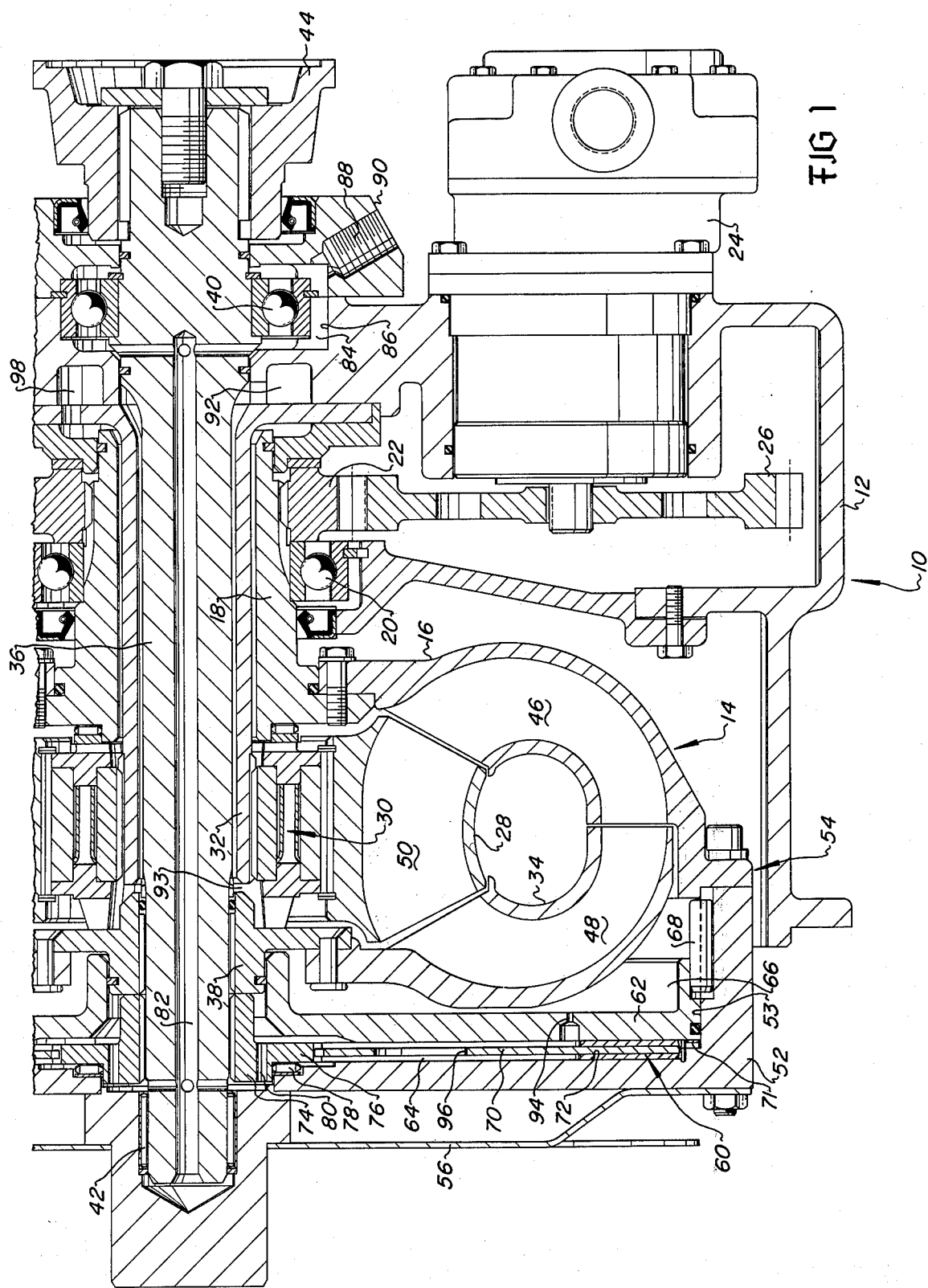
FIG. 1 is a partial longitudinal center section view taken along the line 1—1 of FIG. 2.
Figure 2:
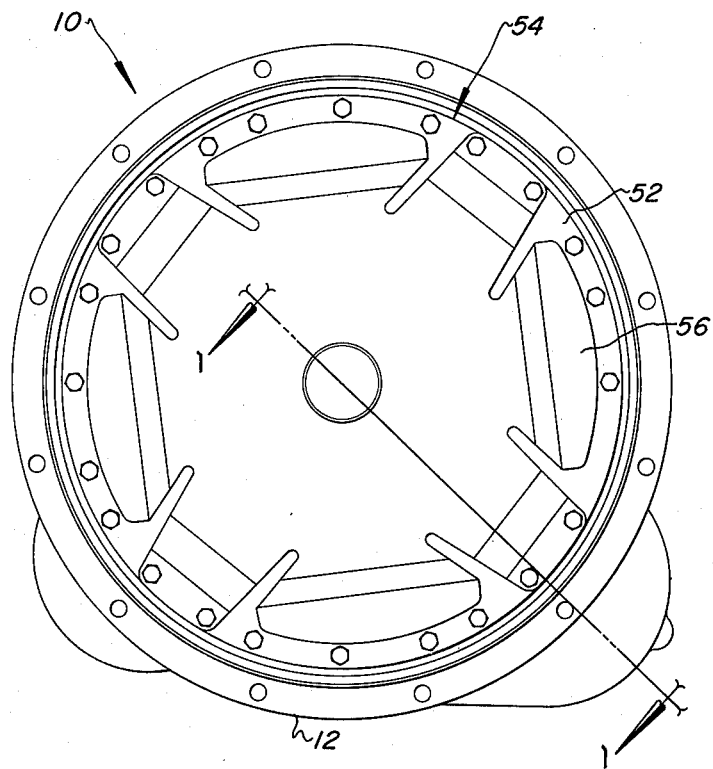
FIG. 2 is a transverse end view of a power transmission mechanism in accordance with the present invention.

Referring to FIG. 1 of the drawings a power transmission mechanism is shown in longitudinal section and generally designated by the numeral 10. The transmission 10 includes a casing 12 in which is disposed a fluid coupling in the form of a hydrokinetic torque converter 14. The torque converter 14 is characterized by an impeller 16 which includes a hub portion 18 rotatably mounted on the casing 12 by means of a suitable bearing assembly 20. A power takeoff gear 22 is drivenly mounted on the hub portion 18 for driving auxiliary power takeoff means such as the pump 24 through an intermediate gear 26. The torque converter 14 also includes a stator member 28 mounted on a one way free wheeling clutch 30 which functions in a known way. The clutch 30 is supported by a stationary tubular member 32 secured to the casing 12. The torque converter 14 further includes a turbine 34 which is mounted on a rotatable output shaft 36. The turbine 34 includes a hub 38 which is in driving engagement with the shaft 36 by suitable interfitting splines or the like. The shaft 36 is mounted for rotation in bearings 40 and 42 and is disposed in concentric spaced relationship within the tubular member 32. The shaft 36 includes a coupling member 44 secured thereon which may be coupled to a driven load. The shaft 36 may also be suitably connected to further transmission gearing and clutches to form a multispeed power transmission mechanism.

The impeller 16, turbine 34 and stator 28 each include respective bladed portions 46, 48, and 50 which form a toroidal flow chamber whereby a suitable liquid is circulated in response to rotation of the impeller to rotatably drive the turbine. The impeller 16 together with a cover member 52 forms a rotating housing 54 in which the turbine 34 and the stator 28 are disposed. A drive member 56 is attached to the cover member 52 and may be suitably connected to an engine flywheel (not shown) or other drive means.

The transmission mechanism 10 includes a friction clutch, generally designated by the numeral 60, and disposed within the torque converter housing 54. The clutch 60 is adapted to provide a positive mechanical driving connection between the torque converter housing 54 and the output shaft 36 thereby forming a positive drive or locked up operating condition of the torque converter fluid coupling members. The clutch 60 includes an axially movable piston 62 which is disposed to divide the interior space of the housing 54 into a chamber 64 and a chamber 66 in which the respective bladed portions of the impeller 16, turbine 34, and stator 28 are disposed. The piston 62 is in substantially fluid sealing relationship with respect to the hub 38 and the interior circumferential wall 53 of the housing cover member 52. Suitable seal members such as a piston ring seal and an O-ring may be disposed respectively between the piston 62 and the hub 38 and the piston and the cover member 52. The piston 62 is also connected for conjoint rotation with the housing 54 by one or more drive pins 68 fitted in keyways formed in the housing and the outer circumference of the piston.

The clutch 60 also includes a driven disk 70 disposed between the piston 62 and the interior transverse wall 72 of the cover member 52. The disk 70 includes suitable friction material fixed on opposing transverse faces of the disk in a conventional manner. The disk 70 is drivingly connected to a hub 74 which is mounted on and drivingly connected to the shaft 36. The hub 74 is characterized by an annular flange 76 engageable with an antifriction thrust bearing assembly 78 of the plural roller type which is disposed between the flange and a relieved portion of the wall 72. The hub 74 also includes axial passage means 80 for placing the chamber 64 in communication with passage means 82 formed in the output shaft 36. The passage means 82 in the shaft 36 is in communication with a passage 84 formed in a cavity 86 in the casing 12 in which the output shaft bearing 40 is mounted. The passage 84 is in communication with passage means 88 formed in a cover member 90 whereby fluid may be conducted from the chamber 64 through the passage means 82 and the cavity 86 to the exterior of the transmission mechanism 10.

Pressure fluid such as conventional torque converter transmission liquid is conducted to the chamber 66 from suitable conduit means, not shown in FIG. 1. in communication with a cavity 92 in the housing 12. Fluid flows from the cavity 92 through the annular space formed between the tubular member 32 and the shaft 36, through a passage 93 between the distal end of the tubular member and the turbine hub 74, and past the one way clutch 30 into the chamber 66 and the toroidal flow chamber formed by the bladed portions of the impeller 16, turbine 34, and stator 28. Fluid may also flow from the chamber 66 into the chamber 64 through a restricted passage or orifice 94 formed in the piston 62. Suitable openings 96 in the disk member 70 provide for flow of fluid into and out of the portions of the chamber 64 formed on opposite sides of the disk member. Fluid flows out of the chamber 64 by way of the passage means 80 and passages 82 and 84. Fluid also flows out of the chamber 66 through passage means formed between the one way clutch 30 and the hub 18 and then into an annular passage formed between the hub 18 and the tubular member 32. The annular passage formed between the hub 18 and the member 32 is in communication with a cavity 98 in the casing 12. A suitable O-ring seal or the like may be interposed between the hub 38 and the shaft 36 to prevent fluid from entering the chamber 64 or passage means 82 directly from the inlet passages.

In accordance with the present invention the clutch 60 may be engaged by controlling the difference in fluid pressure in the chambers 64 and 66. By providing a suitable control valve for controlling the flow of fluid out of the chamber 64 the pressure in that chamber may be varied in relation to the fluid pressure in the chamber 66. A suitable difference in fluid pressure forces acting on the opposed faces of the piston 62 will cause the piston to clamp the disk member 70 between the piston and the cover member 52 to engage the clutch 60. This may be accomplished by allowing fluid to flow out of the chamber 64 relatively unrestricted whereby the orifice 94 will prevent fluid from flowing into the chamber fast enough to develop a high pressure. If the flow of fluid out of the chamber 64 is substantially throttled the pressure in chambers 64 and 66 will equalize and the piston 62 will not be urged into forcible engagement with the disk member 70. Fluid in the chamber 64 will continually bathe the clamping surfaces of the piston 62, disk member 70 and cover member 52 to substantially eliminate any frictional drag forces therebetween. A spring 71 is disposed between the piston 62 and the cover member 52 and exerts a small biasing force on the piston to assist in releasing the clutch 60.

Figure 5:
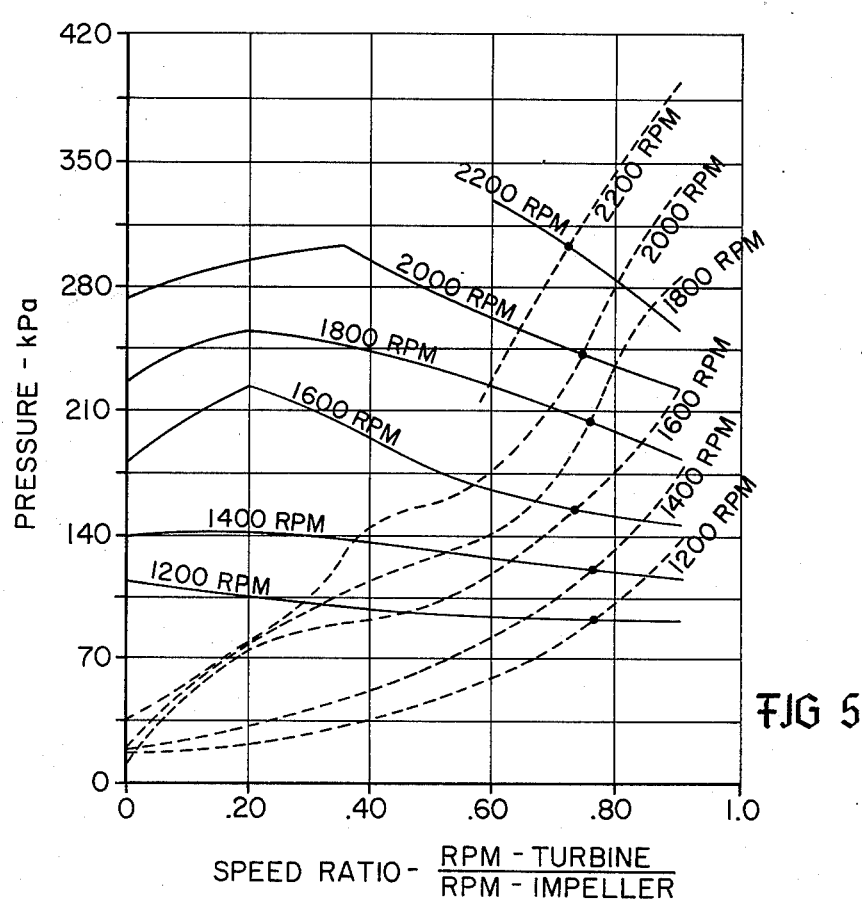

Referring to FIG. 5 there is illustrated a diagram of the fluid pressure developed at or near the inlet and outlet of a torque converter of the general type described herein and for various rotational speeds of the converter impeller. These pressures are represented as a series of dashed lines representing inlet pressure for various impeller rotative speed and a series of solid lines representing outlet pressure for various impeller speeds. The series of lines are plotted as a function of the ratio of the turbine rotational speed with respect to the impeller rotational speed. As may be noted from the diagram of FIG. 5 the inlet pressure for a particular speed condition generally increases as the speed ratio approaches a value of one or unity. The increase in inlet pressure with increasing speed ratio is generally due to the resistance to fluid flow through the converter caused by increasing centrifugal head or backpressure in the turbine 34 as its speed approaches that of the impeller 16. Moreover, due to the decreasing flow with increasing turbine speed, the converter outlet fluid pressure for a particular impeller speed generally decreases as the speed ratio approaches unity and for a particular impeller speed the inlet pressure begins to increasingly exceed the outlet pressure above a speed ratio in the range of 0.70 to 0.80. Accordingly, a suitable control circuit in accordance with the present invention may sense converter inlet pressure to actuate the clutch 60 to become engaged to "lock up" the converter and provide a direct mechanical drive connection at a predetermined speed ratio. Moreover, a control circuit in accordance with the present invention may also sense the converter inlet and outlet pressures to cause engagement of the clutch 60 at a predetermined difference between those pressures.

Figure 3:
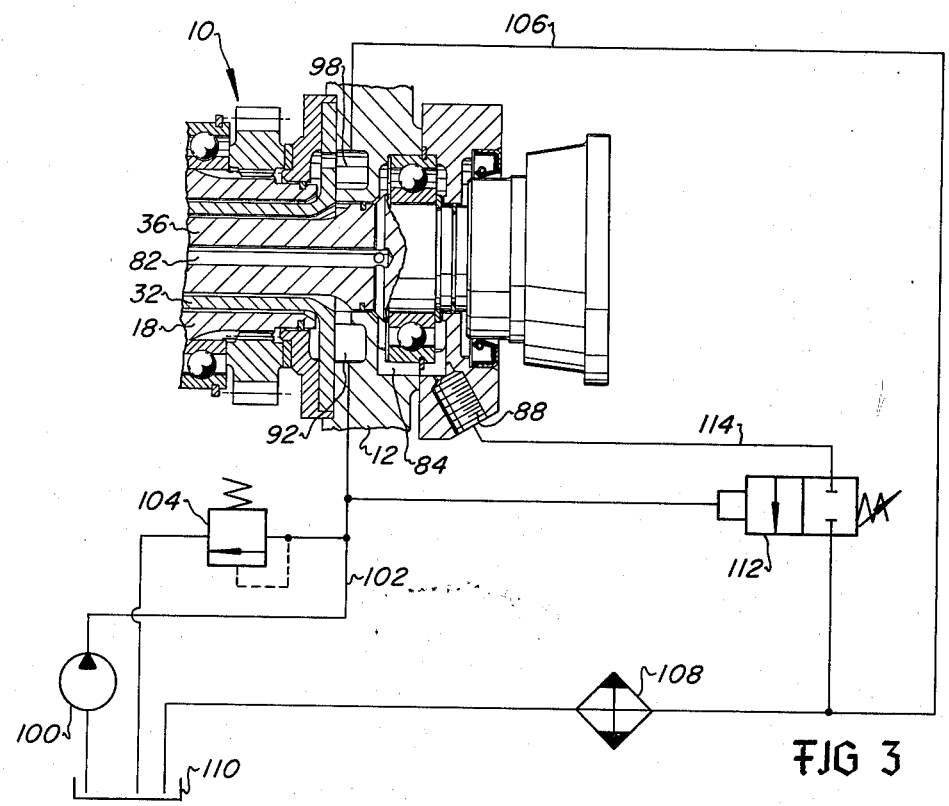
FIG. 3 is a schematic illustration of a fluid control circuit for controlling the engagement of the lockup clutch.

Referring to FIG. 3 a control circuit for the transmission mechanism 10 is illustrated in schematic form. The control circuit of FIG. 3 includes a pump 100 and a conduit 102 for supplying pressure fluid to the cavity 92 in the casing 12. The pump 100 may be adapted to be driven by an auxiliary drive shaft of the transmission mechanism 10 in a conventional manner. A pressure regulator valve 104 provides for limiting the pressure of fluid supplied to the torque converter to a predetermined maximum. The control circuit of FIG. 3 also includes a conduit 106 in communication with the cavity 98 in the casing 12 for conducting pressure fluid from the torque converter 14. The conduit 106 leads to a heat exchanger 108 and to a reservoir 110. The conduit 106 might also lead to the lubrication circuit of the transmission mechanism 10 in the conventional manner. Details of the transmission lubrication circuit have been eliminated in the schematic illustrations of FIGS. 3 and 4 in the interest of conciseness. It will be understood that the conduit 106 or other associated passage means leading from the chamber 66 will provide enough flow restriction to fluid flowing from the torque converter by way of the passage formed between the hub 18 and the member 32 that a variable pressure characteristic in accordance with FIG. 5 may be developed.

The control circuit of FIG. 3 further includes a two position control valve 112 which is interposed in a conduit 114. The conduit 114 is in communication with the passage 82 leading from the chamber 64 of the torque converter housing 54. The valve 112 is spring biased to be in the closed position to block the flow of fluid out of the chamber 64 whereby the clutch 60 will be in the disengaged condition. The valve 112 is responsive to the fluid pressure in the torque converter inlet passage means to shift to provide for relatively free flow of fluid out of the chamber 64 when the converter inlet pressure reaches a predetermined value. Accordingly, the control circuit of FIG. 3 may operate in response to the fluid pressure measured on the inlet fluid circuit side of the torque converter to cause the clutch 60 to become engaged to form a positive direct drive from the torque converter housing to the output shaft 36. The valve 112 would normally be adjusted to shift at a pressure which would only be reached when the transmission mechanism was operating at a relatively high speed condition. Such a condition would, for example, be encountered in a transmission used for vehicle propulsion when the maximum or near maximum cruise speed was achieved.

Figure 4:
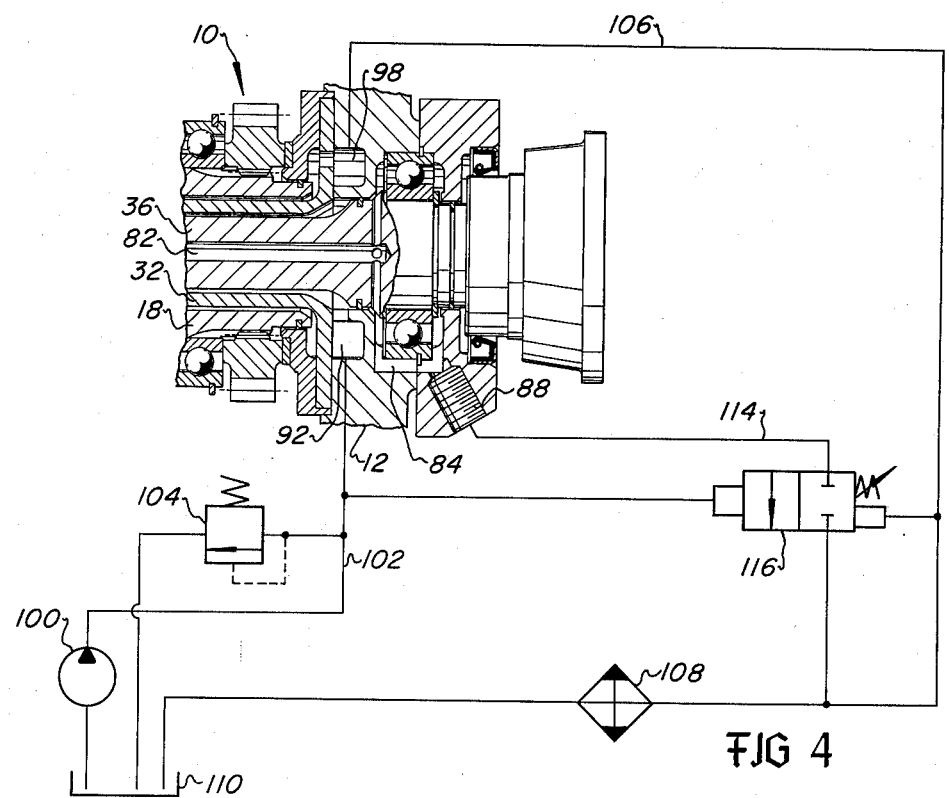
FIG. 4 is another embodiment of a fluid control circuit for controlling the engagement of the lockup clutch; and, FIG. 5 is a diagram illustrating the fluid pressures at the inlet and outlet of the torque converter for various input shaft speeds and in relation to the ratio of the torque converter turbine rotative speed with respect to the impeller rotative speed.

Referring to FIG. 4 there is shown an alternate embodiment of a control circuit for the transmission mechanism of the present invention. The control circuit of FIG. 4 differs from the control circuit of FIG. 3 in that a control valve 116 is interposed in the conduit 114 as shown for controlling the flow of fluid out of the chamber 64 to cause engagement and disengagement of the clutch 60. The valve 116 is pilot operated by pressure fluid to be biased into both positions and is spring biased to be in the closed position. The valve 116 might also be adapted to be a differential pilot actuated type valve without a biasing spring which, due to the pressure characteristic as shown in FIG. 5, could be held in the closed position by fluid pressure only until a predetermined pressure differential was reached. The valve 116 is adapted to sense the fluid pressure in the fluid inlet and outlet flow paths of the torque converter 14. The control circuit of FIG. 4 may operate to cause engagement of the clutch 60 when the pressure in the torque converter inlet conduit exceeds the pressure in the outlet conduit by a predetermined amount. Accordingly, the control circuit of FIG. 4 may operate to cause engagement of the clutch 60 at more than one impeller speed condition since it is dependent on the difference between inlet and outlet pressures.

Although the schematic diagrams of FIGS. 3 and 4 show the sensing of the torque converter inlet and outlet pressures in the conduits leading to and from the cavities 92 and 98 it will be understood that the respective inlet and outlet pressures may be sensed at other points in the fluid circuit including within the passages formed between the hub 18 and tubular member 32 and the tubular member and the shaft 36.

What is claimed is:

1. A transmission mechanism comprising: a hydrokinetic torque converter including a rotatable housing defining an interior space;
   an input drive member connected to said housing;
   fluid impeller means disposed in said interior space;
   a turbine member disposed in said interior space and drivingly connected to an output shaft;
   a torque converter lockup clutch including driving and driven members operable to be engaged to form a positive mechanical driving connection between said housing and said output shaft;
   a piston disposed in said housing and dividing said interior spaced into first and second fluid chambers; said piston being responsive to fluid pressure forces acting thereon for effecting the engagement of said lockup clutch;
   said impeller means and said turbine member being disposed in said first chamber;
   restricted passage means interconnecting said first and second chambers for conducting torque converter working fluid from said first chamber to said second chamber;
   a fluid circuit including means for conducting torque converter working fluid to said first chamber, means for conducting said fluid from said second chamber, and means for conducting fluid from said first chamber without passing through said second chamber; and,
   a control valve adapted to be in a first condition to provide for relatively free flow of fluid out of said second chamber so that the fluid pressure in said first chamber acts on said piston to effect the engagement of said clutch to provide said driving connection between said housing and said output shaft, said control valve is adapted to be in a second condition to substantially block the flow of fluid out of said second chamber whereby the fluid pressure difference between said first and second chambers is minimized, and
   said control valve includes means responsive to a pressure rise of fluid flowing to said first chamber to cause said control valve to be in said first condition.

2. A transmission mechanism comprising:
   a hydrokinetic torque converter including a rotatable housing defining an interior space;
   an input drive member connected to said housing;
   fluid impeller means disposed in said interior space;
   a turbine member disposed in said interior space and drivingly connected to an output shaft;
   a torque converter lockup clutch including driving and driven members operable to be engaged to form a positive mechanical driving connection between said housing and said output shaft;
   a piston disposed in said housing and dividing said interior space into first and second fluid chambers; said piston being responsive to fluid pressure forces acting thereon for effecting the engagement of said lockup clutch;
   said impeller means and said turbine member being disposed in said first chamber;
   restricted passage means interconnecting said first and second chambers for conducting torque converter working fluid from said first chamber to said second chamber;
   a fluid circuit including means for conducting torque converter working fluid to said first chamber, means for conducting said fluid from said second chamber, and means for conducting fluid from said first chamber without passing through said second chamber; and,
   a control valve adapted to be in a first condition to provide for relatively free flow of fluid out of said second chamber so that the fluid pressure in said first chamber acts on said piston to effect the engagement of said clutch to provide said driving connection between said housing and said output shaft, said control valve is adapted to be in a second condition to substantially block the flow of fluid out of said second chamber whereby the fluid pressure difference between said first and second chambers is minimized, and said control valve includes means responive to a predetermined differential between the pressure of fluid flowing to and from said first chamber to cause said control valve to be in said first condition.

* * * * *